United States Patent
Xiong et al.

(10) Patent No.: US 10,421,199 B2
(45) Date of Patent: Sep. 24, 2019

(54) SKIN FOR ROBOT

(71) Applicant: UBTECH Robotics Corp, Shenzhen (CN)

(72) Inventors: Youjun Xiong, Shenzhen (CN); Bin He, Shenzhen (CN); Hailang Zhou, Shenzhen (CN); Musen Zhang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 167 days.

(21) Appl. No.: 15/851,729

(22) Filed: Dec. 21, 2017

(65) Prior Publication Data

US 2019/0152074 A1 May 23, 2019

(30) Foreign Application Priority Data

Nov. 21, 2017 (CN) .......................... 2017 1 1166759

(51) Int. Cl.
| | |
|---|---|
| *B32B 3/00* | (2006.01) |
| *B25J 19/02* | (2006.01) |
| *B25J 19/00* | (2006.01) |
| *B32B 27/08* | (2006.01) |
| *B32B 7/12* | (2006.01) |
| *B32B 7/05* | (2019.01) |

(52) U.S. Cl.
CPC .......... *B25J 19/028* (2013.01); *B25J 19/0075* (2013.01); *B32B 7/05* (2019.01); *B32B 7/12* (2013.01); *B32B 27/08* (2013.01); *B32B 2457/00* (2013.01); *Y10S 901/46* (2013.01)

(58) Field of Classification Search
CPC ....... B25J 19/028; B25J 19/0075; B32B 7/05; B32B 7/12; B32B 27/08
See application file for complete search history.

(56) References Cited

U.S. PATENT DOCUMENTS

| | | | |
|---|---|---|---|
| 2011/0307097 A1* | 12/2011 | Colledani | G01D 5/16 700/255 |
| 2014/0238153 A1* | 8/2014 | Wood | G06F 3/011 73/862.627 |
| 2016/0157343 A1* | 6/2016 | Abe | H05K 1/0283 361/749 |
| 2016/0187166 A1* | 6/2016 | Ranky | H01L 41/314 602/27 |
| 2018/0117875 A1* | 5/2018 | Berzins | A63H 9/00 |

* cited by examiner

*Primary Examiner* — Elizabeth E Mulvaney

(57) ABSTRACT

A skin for a robot includes a first composite layer structure, a second composite layer structure and a number of first insulating protrusions. The first composite layer structure is used to be arranged on a housing of the robot, and includes a base adhesive layer arranged on the housing of robot, a first supporting layer stacked on the base adhesive layer and a first silver conductive adhesive layer stacked on the first supporting layer. The second composite layer structure covers the first composite layer, and includes a second silver conductive adhesive layer stacked on the first composite layer structure, and a second supporting layer stacked on the second silver conductive adhesive layer. The first insulating protrusions are arranged between the first silver conductive adhesive layer and the second silver conductive adhesive layer, and separate the first silver conductive adhesive layer and the second silver conductive adhesive layer.

10 Claims, 3 Drawing Sheets

SKIN FOR ROBOT

CROSS REFERENCE TO RELATED APPLICATIONS

This application claims priority to Chinese Patent Application No. 201711166759.7, filed Nov. 21, 2017 which is hereby incorporated by reference herein as if set forth in its entirety.

BACKGROUND

1. Technical Field

The present disclosure generally relates to robots, and particularly to a skin for a robot.

2. Description of Related Art

Robots can perform various tasks and typically include actuators, driving devices, sensing devices and control systems. There have been significant demands for robotic devices (or robots as these terms may be used interchangeably) that simulate humans, animals, and other living beings or characters. In simulating humans or human-like characters, the robots are typically covered in a skin that is fabricated of flexible material to move naturally with the underlying robotics. In October 2015, the Disney Research demonstrated a robotic skin that is very soft and will not cause any damage when it picks up delicate objects. One problem with such skin is that it does not have a good sensitivity.

In actual use, it needs to detect whether the robot is touched so that the robot can respond to the touch event. For example, if a robot's arm bumps into an obstacle while moving, an injury may be caused if the robot cannot perceive the bump and continues to move. Typically, two detection methods, i.e., a detection method based on a capacitive film and a detection method based on force sensitive material, have been used for detecting a touch event. The first detection method can detect a conductor touch and a human touch, but cannot detect a non-conductor touch. The second detection method can detect the resistance changes when the sensors are deformed and can then determine whether there is a touch. However, the sensitivity of force sensitive material is relatively low. The sensors may not be deformed if the pressure is small.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
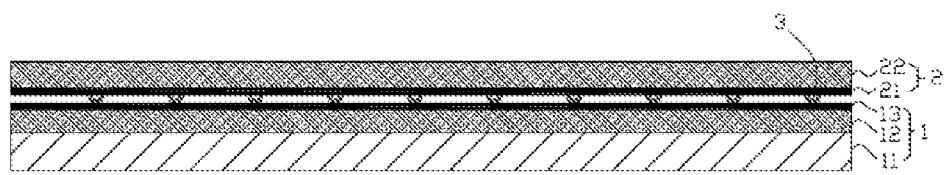
FIG. 1 is a schematic sectional view of a skin for a robot according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Referring to FIG. 1 in one embodiment, a skin for a robot includes: a first composite layer structure 1 and a second composite layer structure 2. The first composite layer structure 1 is arranged on a housing of the robot, and includes a base adhesive layer 11 arranged on the housing of the robot, a first supporting layer 12 stacked on the base adhesive layer 11 and a first silver conductive adhesive layer 13 stacked on the first supporting layer 12. The second composite layer structure 2 is arranged on the first composite layer 1, and includes a second silver conductive adhesive layer 21 stacked on the first composite layer structure 1, and a second supporting layer 22 stacked on the second silver conductive adhesive layer 21. A number of first insulating protrusions 3 are arranged between the first silver conductive adhesive layer 13 and the second silver conductive adhesive layer 21. The first insulating protrusions are used to separate the first silver conductive adhesive layer 1 and the second silver conductive adhesive layer 21. The first silver conductive adhesive layer 13 is electronically contactable with the second silver conductive adhesive layer 21 upon a condition that a force is applied to the second composite layer structure 2.

According to the skin in the embodiment of the present disclosure, each of the two silver conductive adhesive layers is connected with a conductive terminal (collectively referred to as terminal A and terminal B below). The terminal A is grounded, and the terminal B is connected to a pull-up power supply and a GPIO pin of a microcontroller. The microcontroller is used to detect the high level and low to level of the GPIO pin. When there is no touch, no force is applied on the skin and the first insulating protrusions 3 isolate the two silver conductive adhesive layers. The microcontroller then detects a high level at the GPIO pin. When the skin touches an object, the second supporting layer 22 of the second composite layer structure 2 is then deformed, the first silver conductive adhesive layer 13 and the second silver conductive adhesive layer 21 are brought into contact with each other. The microcontroller then detects a low level at the GPIO pin and can then detect a touch event.

The skin of the embodiment of the present disclosure has high sensitivity. More importantly, the height and the density of the first insulating protrusions 3 can be adjusted according to the actual needs so as to reduce the false detection rate while ensuring the high sensitivity. In addition, the skin provided by the present disclosure can be widely used and has an advantage of low costs. For example, the cost can be as low as 1%-10% of the cost of the touch detection method based on the force sensitive material.

One example of the application of the skin is that the base adhesive layer 11 is arranged on the arms of a robot.

The first supporting layer 12 is disposed on the base adhesion layer 11 as an adhesive layer for supporting the silver conductive adhesive layer. In one embodiment, the first supporting layer can be one of a PET layer, a PC layer, a PVC layer and a PP layer. The preferred material of the supporting layer has the property that it can be easily pressed into a film so as to be attached to the base as layer 11. In one embodiment, the first supporting layer 12 is a PET layer that can be easily processed into a thin film structure and has a long service life and good ductility. In one embodiment, the thickness of the first supporting layer 12 is in the range of 0.08 mm to 0.12 mm, so that the first supporting layer 12 can effectively support other functional structures (e.g., a silver conductive adhesive layer and insulating protrusions) stacked thereon. With such configuration the first supporting layer 12 will not have an excessive thickness, which can prevent that the first supporting layer 12 warps after being attached to the base adhesive layer 11. In one embodiment, the thickness of the first supporting layer 12 is 0.1 mm.

The first silver conductive adhesive layer 13 serves as a sensing layer and is disposed on the housing of the robot through the first supporting layer 12 and the base adhesive layer 11. The thickness of the first silver conductive adhesive layer 13 is satisfactory if it allows that an electrical connection can be provided after the first silver conductive adhesive layer 13 is brought into contact with the second silver conductive adhesive layer 21. In one embodiment, the thickness of the first silver conductive adhesive layer 3 is in the range of 0.08 mm to 0.12 mm, which ensures the conductivity while reducing the production cost. In one embodiment, the thickness of the first silver conductive adhesive layer 13 is 0.1 mm.

The second silver conductive adhesive layer 21 is disposed opposite to the first silver conductive adhesive layer 13 and separated by the first insulating protrusions 3 disposed between the first composite layer structure 1 and the second composite layer structure 2. The thickness of the second silver conductive adhesive layer 21 is satisfactory if it allows that an electrical connection can be provided after the first silver conductive adhesive layer 13 is brought into contact with the second silver conductive adhesive layer 21. In one embodiment, the thickness of the second silver conductive adhesive layer 21 is in the range of 0.08 mm to 0.12 mm, which ensures the conductivity while reducing the production cost. In one embodiment, the thickness of the second silver conductive adhesive layer 21 is 0.1 mm.

The second supporting layer 2 is used to receive a touch and can be deformed and transmit the deformation to the second silver conductive adhesive layer 21 so that the second silver conductive adhesive layer 21 is pressed and brought in contact with the first silver conductive adhesive layer 13. The microcontroller can then detect a low level at the GPIO pin, to achieve the touch event detection. The second supporting layer 22 is also used to support the second silver conductive adhesive layer 21 so as to allow the second silver conductive adhesive layer 21 to maintain a complete layered structure. Specifically, the material of the second supporting layer 22 is selected not only to be capable of supporting the second silver conductive adhesive layer 21 to a certain extent, but also to have the second supporting layer 22 to have high sensitivity to touch and to transmit the touch through deformation thereof.

The second supporting layer 22 can be one of a PET layer, a PC layer, a PVC layer and a PP layer. The preferred material of the supporting layer has the property that it can be easily pressed into a film and is responsive to the touch event and can trigger the touch response. In one embodiment, the second supporting layer 22 is a PET layer that can be easily processed into a thin film structure and has a long service life and good ductility, which can increase the detection sensitivity. In one embodiment, the thickness of the second supporting layer 22 is in the range of 0.08 mm to 0.12 mm. With such configuration, the second supporting layer 22 is prevented from having an insufficient thickness, which increases both the sensitivity and the fake detection rate. The second supporting layer 22 is also prevented from having an excessive thickness which reduces the touch detection sensitivity. In one embodiment, the thickness of the second supporting layer 22 is 0.1 mm.

In the embodiment, a number of first insulating protrusions 3 for separating the first silver conductive adhesive layer 13 and the second silver conductive adhesive layer 21 are disposed between the first composite layer structure 1 and the second composite layer structure 2. The first in protrusions 3 are also used for supporting the second silver conductive adhesive layer 21. When there is no touch, the first silver conductive adhesive layer 13 and the second silver conductive adhesive layer 21 are separated by the first insulating protrusions 3, and the two are kept at a certain distance from each other. When there is a touch event, the second silver conductive adhesive layer 21 is deformed and contacts the first silver conductive adhesive layer 13 at locations without the first insulating protrusion 3. The microcontroller then detects a low level at the GPIO pin, thereby achieving the detection of the touch event.

In the embodiment, one end of each of the first insulating protrusion 3 may be fixedly connected to the lower side of the second silver conductive adhesive layer 21 and the other opposite end abuts against the first silver conductive adhesive layer 13. In other embodiments, one end of each of the first insulating protrusions 3 may be fixedly connected to the upper side of the first silver conductive adhesive layer 13 and the other opposite end abuts against the second silver conductive adhesive layer 21. Alternatively, opposite ends of the first insulation protrusions 3 are fixedly connected to the second silver conductive adhesive layer 21 and the first silver conductive adhesive layer 13. In one embodiment, each first insulating protrusion 3 is semi-spherical, with the semi-spherical surface facing the second composite layer structure 2. In one embodiment, each first insulating protrusion 3 can be of a hollow structure so that the first silver conductive adhesive layer 13 and the second silver conductive adhesive layer 21 can be brought into contact with each other under a relatively small external force, which improves the sensitivity of the skin.

In order to avoid direct cot tact between the second silver conductive adhesive layer 21 and the first silver conductive adhesive layer 13 and reduce the false detection rate, it is advantageous that the height of each first insulating protrusion 3 is equal to or greater than 10 μm. In one embodiment, the height of each first insulating protrusion is in the range of 10 μm to 16 μm, so as to ensure a suitable distance between the second silver conductive adhesive layer 21 and the first silver conductive adhesive layer 13. The height of the first insulating protrusions 3 can be adjusted according to actual needs. It needs to prevent that the first insulating protrusions 3 have an insufficient height, which increases the false detection rate of the touch event. It also needs to prevent that the first insulating protrusions 3 have an excessive height, which increases the difficulty in bringing the second silver conductive adhesive layer 21 and the first silver conductive adhesive layer 13 into contact with each other, thereby reducing the detection sensitivity. The sensitivity can be increased by increasing the density of the first insulating protrusions 3 according to the size of the skin. In order to balance the sensitivity and the false detection rate, it is preferable that the distance between two adjacent first insulating protrusions 3 is in the range of 4 mm to 15 mm and can be any of 4 mm, 7 mm, 10 mm, 12 mm and 15 mm, for example. In general, the higher the density of the first insulating protrusions 3 is, the lower the sensitivity is. The smaller the density of the first insulating protrusions 3 is, the higher the sensitivity is. In the embodiment, the first insulating protrusions 3 are uniformly distributed, i.e., the distances between two adjacent first insulating protrusions 3 are equal, so as to have a stable response to the touch event.

In the embodiment, the first insulating protrusions 3 are made of insulating ink. The insulating ink can efficiently produce the first insulating protrusions 3 with high quality and high precision by printing.

Figure 2:
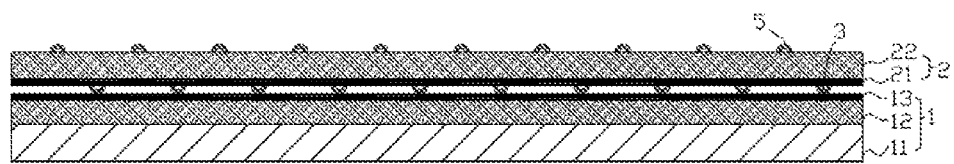
FIG. 2 is a schematic sectional view of a skin for a robot according to an embodiment.

Referring to FIG. 2, in one embodiment, the upper side of the second supporting layer 22 facing away from the second silver conductive adhesive layer 21 is provided with a plurality of second insulating protrusions 5.

When the second supporting layer 22 is pressed, the second supporting layer 22 is brought into contact with the first silver conductive adhesive layer 13 by the force transmitted by some of the second insulating protrusion 5 to adjust the detection sensitivity of the skin.

In one embodiment, the second insulation protrusions 5 and the first insulation protrusions 3 are arranged in an alternately manner along a horizontal direction in FIG. 2, which improves the detection sensitivity. In one embodiment, the height of each second insulating protrusion 5 is equal to or greater than 10 μm. In one embodiment, the distance between two adjacent second insulating protrusions 5 is in the range of 4 mm to 15 mm.

Figure 3:
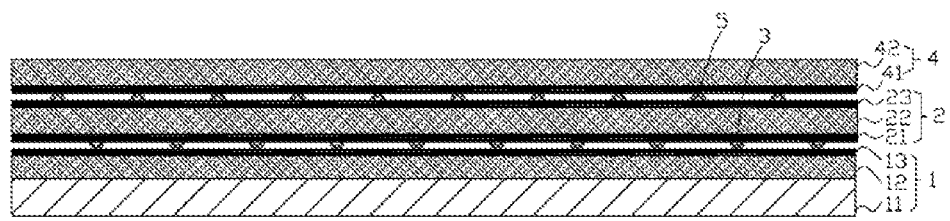
FIG. 3 is a schematic sectional view of a skin for a robot according to an embodiment.

Referring to FIG. 3, in one embodiment, the second composite layer structure 2 further includes a third silver conductive adhesive layer 23 disposed on the second supporting layer 22 and opposite to the second silver conductive adhesive layer 21.

The skin further includes a third composite layer structure 4 disposed on the side of the second composite layer structure 2 away from the first composite layer structure 1 and including, from bottom to top as shown in FIG. 3, a fourth silver conductive adhesive layer 41 and a third supporting layer 42.

A number of second insulating protrusions 5 for separating the third silver conductive adhesive layer 23 and the fourth silver conductive adhesive layer 41 are disposed between the third silver conductive paste layer 23 and the fourth silver conductive adhesive layer 41.

Generally, the more the insulating protrusions between the second silver conductive adhesive layer 21 and the first silver conductive adhesive layer 13, the worse the sensitivity and the lower the false detection rate; and on the contrary, the higher the sensitivity, the higher false detection rate. In view of this, in the present embodiment, a double sandwich structure composed of two silver conductive adhesive layers and a layer of insulating protrusions is formed with the addition of the third silver conductive adhesive layer 23, the second insulating protrusions 5 and the third composite layer structure 4, which can effectively balance the sensitivity and the false detection rate, thus ensuring a lower false detection rate and a high sensitivity. Specifically, by providing the second insulating protrusions 5, when the number of the insulating protrusions is relatively constant, the insulating protrusions are disposed at two layers, that is, the first insulating protrusions 3 and the second insulating protrusions 5. In this case, the protrusions between the second silver conductive adhesive layer 21 and the first silver conductive adhesive layer 13 only account for a portion of the all the protrusions, so that relatively higher sensitivity can be achieved with lower false detection rate. In the embodiment, the first insulating protrusions 3 are evenly distributed and the second insulating protrusions 5 are evenly distributed. It is conducive to balance the sensitivity and false detection rate by alternately arranging the second insulating protrusions 5 and the first insulating protrusions 3 along a horizontal direction. The density of the protrusions can be adjusted through the double structure, which is conducive to reaching a balance point between sensitivity and false detection rate.

Specifically, the second composite layer structure 2 further includes a third silver conductive paste layer 23 disposed on the second supporting layer 22 and opposite to the second silver conductive paste layer 21. In one embodiment, the thickness of the third silver conductive paste layer 23 is in the range of 0.08 mm to 0.12 mm. It should be noted that the production cost will be increased if the third silver conductive adhesive layer 23 is formed with excessive height. In one embodiment, the thickness of the third silver conductive adhesive layer 23 is 0.1 mm.

The third composite layer structure 4 is arranged above the second composite layer structure 2. Specifically, the third composite layer structure 4 is arranged above the surface of the second composite layer structure 2 as from the housing of the robot. The third composite layer structure 4 includes, from bottom to top as shown in FIG. 3, a fourth silver conductive paste layer 41 and a third supporting layer 42.

The fourth silver conductive adhesive layer 41 is disposed opposite to the third silver conductive adhesive layer 23 and separated by the second insulating protrusions 5 disposed therebetween. In one embodiment, the second insulating protrusions 5 and the first insulating protrusions 3 are alternately arranged in a horizontal direction, which is conducive to improving the detection sensitivity. The thickness of the fourth silver conductive adhesive layer 41 is satisfactory if it allows that an electrical connection can be provided after the fourth silver conductive adhesive layer 41 is brought into contact with the third silver conductive adhesive layer 23. In one embodiment, the thickness of the fourth silver conductive adhesive layer 41 is in the range of 0.08 mm to 0.12 mm. It should be noted that the production cost will be increased if the fourth silver conductive adhesive layer 41 is formed with excessive height. In one embodiment, the thickness of the fourth silver conductive adhesive layer 41 is 0.1 mm.

In the embodiment, one end of each of the second insulating protrusion 5 may be fixedly connected to the lower side of the fourth silver conductive adhesive layer 41 and the other opposite end abuts against the third silver conductive adhesive layer 23. In other embodiments, one end of each of the second insulating protrusions 5 may be fixedly connected to the upper side of the third silver conductive adhesive layer 23 and the other opposite end abuts against the fourth silver conductive adhesive layer 41. Alternatively, opposite ends of the second insulation protrusions 5 are fixedly connected to the fourth silver conductive adhesive layer 41 and the third silver conductive adhesive layer 23. In one embodiment, each second insulating protrusion 5 is semi-spherical, with the semi-spherical surface facing the third composite layer structure 4. In one embodiment, each second insulating protrusion 5 can be of a hollow structure so that the fourth silver conductive adhesive layer 41 and the third silver conductive adhesive layer 23 can be brought into contact with each other under a relatively small external force, which improves the sensitivity of the skin.

In one embodiment, the height of each second insulating protrusion 5 is equal to or greater than 10 μm. In one embodiment, the height of each second insulating protrusion 5 is in the range of 10 μm to 16 μm, so as to ensure a suitable distance between the fourth silver conductive adhesive layer 41 and the third silver conductive adhesive layer 23. The height of the second insulating protrusions 5 can be adjusted according to actual needs. It needs to prevent that the second insulating protrusions 5 have an insufficient height, which increases the false detection rate of the touch event. It also needs to prevent that the second insulating protrusions 5 have an excessive height, which increases the difficulty in bringing the fourth silver conductive adhesive layer 41 and the third silver conductive adhesive layer 23 into contact with each other, thereby reducing the detection sensitivity. The sensitivity can be increased by increasing the density of the first insulating protrusions 3 according to the size of the skin. In order to balance the sensitivity and the false detection rate, it is preferable that the distance between two adjacent second insulating protrusions 5 is in the range of 4 mm to 15 mm and can be any of 4 mm, 7 mm, 10 mm, 12 mm and 15 mm, for example. In general, the higher the density of the second insulating protrusions 5 is, the lower the sensitivity is. The smaller the density of the second insulating protrusions 5 is, the higher the sensitivity is. In the embodiment, the second insulating protrusions 3 are uniformly distributed, i.e., the distances between two adjacent second insulating protrusions 3 are equal, so as to have a stable response to the touch event.

In the embodiment, the second insulating protrusions 5 are made of insulating ink. The insulating ink can efficiently produce the second insulating protrusions 5 with high quality and high precision by printing. The third supporting layer 42 is used to receive a touch and can be deformed and transmit the deformation to the fourth silver conductive adhesive layer 41. The third supporting layer 42 is also used to support the fourth silver conductive adhesive layer 41 so as to allow the fourth silver conductive adhesive layer 41 to maintain a complete layered structure. Specifically, the material of the third supporting layer 42 should have a high sensitivity to touch and can transmit the touch response by deformation. In one embodiment, the third supporting layer 42 can be one of a PET layer, a PC layer, a PVC layer and a PP layer. The preferred material of the supporting layer has the property that it can be easily pressed into a film and more importantly, it is responsive to the touch event and can trigger the touch response. In one embodiment, the third supporting layer 42 is a PET layer that can be easily processed into a thin film structure and has a long service life and good ductility, which can improve detection sensitivity. In one embodiment, the thickness of the third supporting layer 42 is in the range of 0.08 mm to 0.12 mm. In one embodiment, the thickness of the third supporting layer 42 is about 0.1 mm.

The double sandwich structure of two silver conductive adhesive layers and a layer of insulating protrusions functions as two parallel membrane switches. That is, the third silver conductive adhesive layer 23 and the second silver conductive adhesive layer 13 form a membrane switch, and the fourth silver conductive adhesive layer 41 and the third silver conductive adhesive layer 23 form another membrane switch. Two silver adhesive layers of each membrane switch function as switch metal contacts, respectively, which are connected to the positive terminal and negative terminal of a power supply. After the third supporting layer 42 receives a touch and is deformed, the fourth silver conductive adhesive layer 41 contacts the third silver conductive adhesive layer 23, and the third silver conductive adhesive layer 23 contacts the second silver conductive adhesive layer 13. The microcontroller then detects a low level and can thus detect the touch event.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A skin for a robot, the skin comprising:
   a first composite layer structure configured to be arranged on a housing of the robot, the first composite layer structure comprising a base adhesive layer arranged on the housing of robot, a first supporting layer stacked on the base adhesive layer and a first silver conductive adhesive layer stacked on the first supporting layer;
   a second composite layer structure configured to cover the first composite layer, the second composite layer comprising a second silver conductive adhesive layer stacked on the first composite layer structure, and a second supporting layer stacked on the second silver conductive adhesive layer; and
   a plurality of first insulating protrusions arranged between the first silver conductive adhesive layer and the second silver conductive adhesive layer, the first insulating protrusions being configured to separate the first silver conductive adhesive layer and the second silver conductive adhesive layer;
   wherein the first silver conductive adhesive layer is electronically contactable with the second silver conductive adhesive layer upon a condition that a force is applied to the second composite layer structure.

2. The skin according to claim 1 further comprising a plurality of second insulating protrusions that are arranged on a surface of the second supporting layer facing away from the second silver conductive adhesive layer.

3. The skin according to claim 1 further comprising a third composite layer structure, wherein the second composite layer structure further comprises a third silver conductive adhesive layer arranged on the second supporting layer; the third composite layer structure is stacked on a side of the second composite layer structure away from the first composite layer structure and includes a fourth silver conductive adhesive layer stacked on the third silver conductive adhesive layer and a third supporting layer stacked on the fourth silver conductive adhesive layer; and plurality of second insulating protrusions are arranged between the third silver conductive adhesive layer and the fourth silver conductive adhesive layer and configured to separate the third silver conductive adhesive layer and the fourth silver conductive adhesive layer.

4. The skin according to claim 1, wherein a height of each of the first insulating protrusion is equal to or greater than 10 µm; and/or a distance between two adjacent first insulation protrusions is in a range of 4 mm to 15 mm.

5. The skin according to claim 4, wherein the height of each of the first insulating protrusion is in a range of 10 µm to 16 µm.

6. The skin according to claim 2, wherein a height of each of the second insulation protrusion is equal to or greater than 10 µm; and/or a distance between two adjacent first insulation protrusions is in a range of 4 mm to 15 mm.

7. The skin according to claim 1, wherein the first supporting layer is one of a PET layer, a PC layer, a PVC layer and a PP layer; and/or the second supporting layer is one of a PET layer, a PC layer, a PVC layer and a PP layer.

8. The skin according to claim 3, wherein the third supporting layer is one of a PET layer, a PC layer, a PVC layer and a PP layer.

9. The skin according to claim 1, wherein a thickness of the first silver conductive adhesive layer is in a range of 0.08 mm to 0.12 mm; and/or a thickness of the second silver conductive adhesive layer is in a range of 0.08 mm to 0.12 mm; and/or a thickness of the first supporting layer is in a range of 0.08 mm to 0.12 mm; and/or a thickness of the second supporting layer is in a range of 0.08 mm to 0.12 mm.

10. The skin according to claim 3, wherein a thickness of the third silver conductive adhesive layer is in a range of 0.08 mm to 0.12 mm; and/or a thickness of the fourth silver conductive adhesive layer is in a range of 0.08 mm to 0.12 mm; and/or the third support layer has a thickness of 0.08 mm-0.12 mm.

\* \* \* \* \*